(12) United States Patent
Dieselberg et al.

(10) Patent No.: US 9,992,114 B1
(45) Date of Patent: Jun. 5, 2018

(54) SELECTIVE MAC ADDRESS LEARNING

(71) Applicant: Adtran, Inc., Huntsville, AL (US)

(72) Inventors: Chad Anthony Dieselberg, Madison, AL (US); Nagaraj Padur, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 0 days. days.

(21) Appl. No.: 15/367,511

(22) Filed: Dec. 2, 2016

(51) Int. Cl.
| | |
|---|---|
| *H04J 14/00* | (2006.01) |
| *H04L 12/743* | (2013.01) |
| *H04L 12/751* | (2013.01) |
| *H04L 12/721* | (2013.01) |
| *H04L 12/761* | (2013.01) |
| *H04B 10/27* | (2013.01) |
| *H04L 29/12* | (2006.01) |

(52) U.S. Cl.
CPC ......... *H04L 45/7457* (2013.01); *H04B 10/27* (2013.01); *H04L 45/02* (2013.01); *H04L 45/16* (2013.01); *H04L 45/66* (2013.01); *H04L 61/6022* (2013.01)

(58) Field of Classification Search
CPC ..... H04L 45/66; H04L 45/54; H04L 12/4633; H04L 45/00; H04L 45/16; H04L 45/48
USPC .......................................................... 398/66
See application file for complete search history.

(56) References Cited

U.S. PATENT DOCUMENTS

| | | | |
|---|---|---|---|
| 2003/0202513 A1* | 10/2003 | Chen ..................... | H04L 12/462 370/390 |
| 2011/0268435 A1* | 11/2011 | Mizutani ................. | H04L 45/22 398/5 |
| 2015/0016262 A1* | 1/2015 | Friskney ............. | H04L 12/4645 370/235 |
| 2015/0156108 A1* | 6/2015 | Shi ...................... | H04L 12/4658 370/218 |
| 2016/0043950 A1* | 2/2016 | Vobbilisetty .......... | H04L 45/745 370/392 |
| 2016/0380876 A1* | 12/2016 | Calciu ................... | H04L 45/021 370/254 |

* cited by examiner

*Primary Examiner* — Don N Vo
(74) *Attorney, Agent, or Firm* — Fish & Richardson P.C.

(57) ABSTRACT

Methods, systems, and apparatus for selective MAC address learning are disclosed. In one aspect, multiple different packets are received by a telecommunications device. The multiple different packets include different source MAC addresses. For each of the multiple different packets, a distribution type is determined. The distribution type is one of a one-to-one distribution type or a one-to-many distribution type. Based on the determined distribution type of the particular packet, a forwarding table of the telecommunications device is selectively updated. When the particular packet has the one-to-many distribution type, a source MAC address that is included in the particular packet is not stored in the forwarding table. When the particular packet has the one-to-one distribution type, the source MAC address that is included in the particular packet is stored in the forwarding table.

20 Claims, 3 Drawing Sheets

SELECTIVE MAC ADDRESS LEARNING

BACKGROUND

This specification relates to MAC address learning.

Ethernet switching devices generally learn MAC addresses using a Source-Address-Learning method. For each received Ethernet packet, an Ethernet switching device learns MAC address of packet source via source MAC address in the Ethernet packet. The Ethernet switching device can store the learned source MAC address in its Content Addressable Memory (CAM) forwarding table.

SUMMARY

In general, one innovative aspect of the subject matter described in this specification can be embodied in methods for selective MAC address learning by network devices with limited MAC address Content Addressable Memory (CAM) forwarding table spaces in Ethernet MAC-Switched Networks. One example computer-implemented method includes receiving, by a telecommunications device, multiple different packets that include different source MAC addresses, determining a distribution type of each of the multiple different packets, the distribution type being one of a one-to-one distribution type or a one-to-many distribution type, and selectively updating a forwarding table of the telecommunications device based on the determined distribution type of the particular packet. The selectively updating comprises the following operations: not storing a source MAC address that is included in the particular packet when the particular packet has the one-to-many distribution type, and storing the source MAC address that is included in the particular packet when the particular packet has the one-to-one distribution type.

These and other embodiments can each, optionally, include one or more of the following features. Receiving the multiple different packets comprises receiving the multiple different packets that are transmitted over a same Virtual LAN (V-LAN). The telecommunications device is an Optical Network Unit (ONU). The telecommunications device is an Optical Line Termination (OLT). Determining the distribution type of each of the multiple different packets comprises the following operations: identifying unicast packets that have known destination MAC addresses, and determining that the unicast packets are of the one-to-one distribution type. Packets of the one-to-many distribution type include broadcast packets and multicast packets. The forwarding table of the telecommunications device is a Content Addressable Memory (CAM) forwarding table.

Particular embodiments of the subject matter described in this specification can be implemented so as to realize one or more of the following advantages. The methods, devices, and/or systems described in the present disclosure can selectively learn MAC addresses, by a telecommunications device, using a Source-Address-Learning method based on a distribution type of each received packet. If the received packet is a unicast packet, source MAC address in the received packet can be learned (e.g., used to update a CAM forwarding table of the telecommunications device). However, if the received packet is a broadcast packet or a multicast packet, the source MAC address in the received packet will not be learned (e.g., not used to update the CAM forwarding table of the telecommunications device). In doing so, MAC addresses that typically do not carry traffic for the telecommunications device (i.e., undesirable MAC addresses) will not be stored in the CAM forwarding table of the telecommunications device, thereby resulting in more efficient use of a limited amount of memory available in the telecommunications device. For example, in situations where the telecommunications device has a limited CAM forwarding table space, desirable MAC addresses (i.e., MAC addresses that carry traffic specifically addressed for delivery to the telecommunications device) stored in the CAM forwarding table will not be over-written by undesirable MAC addresses that typically do not carry traffic for the telecommunications device (e.g., source MAC addresses in broadcast/multicast packets that are note specifically addressed for delivery to the telecommunications device). In addition, since the CAM forwarding table stores only desirable MAC addresses, the likelihood of flooding a unicast packet due to unknown destination MAC address in the CAM forwarding table will be reduced. As a result, allocated bandwidth of an Ethernet LAN (E-LAN) can be preserved from being flooded (e.g., used up) with unicast packets, thereby making the allocated bandwidth available to carry assigned traffic, especially on E-LANs with many hosts that generate significant broadcast/multicast traffic.

While some aspects of this disclosure refer to computer-implemented software embodied on tangible media that processes and transforms data, some or all of the aspects may be computer-implemented methods or further included in respective systems or devices for performing the described functionality. The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
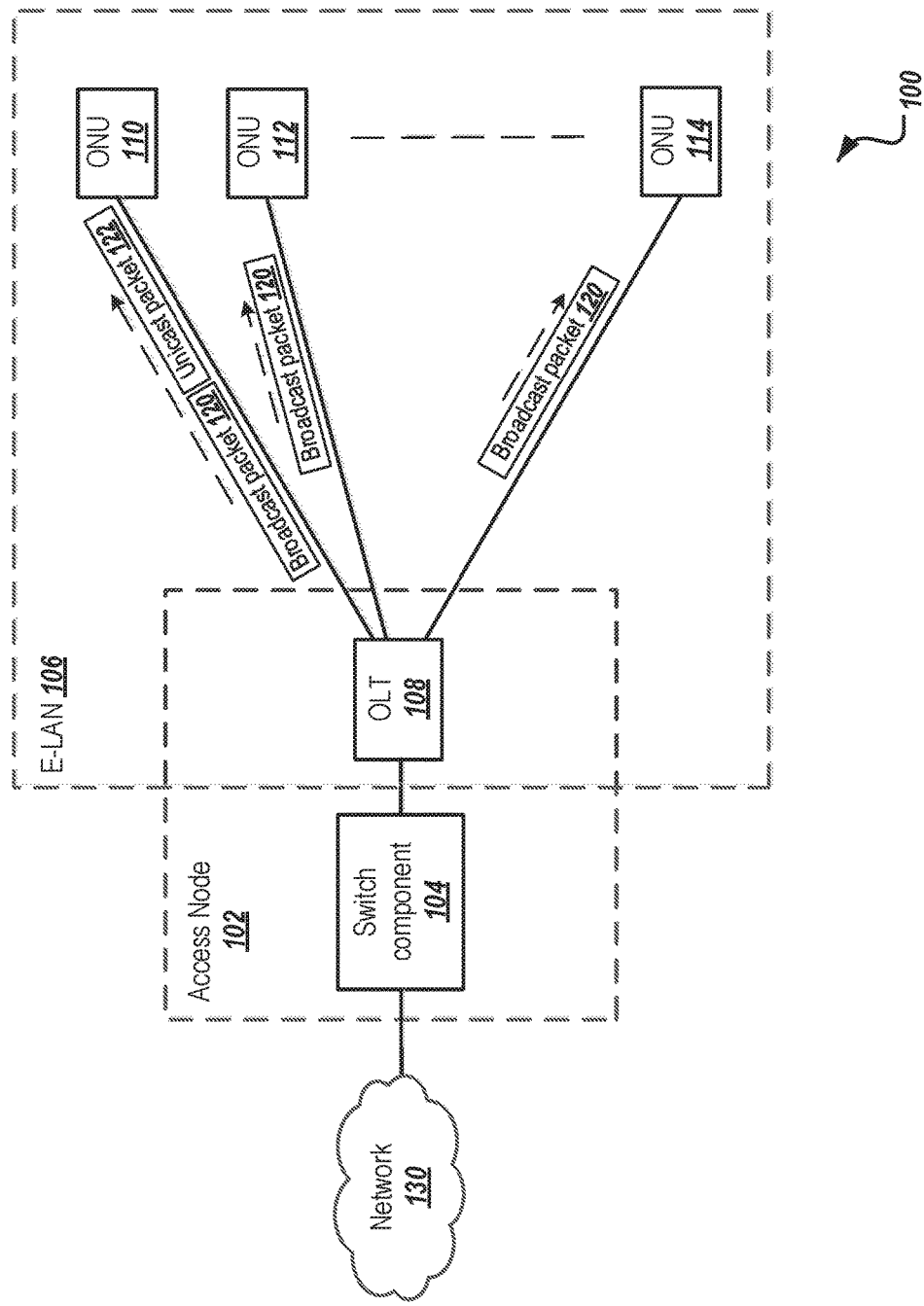
FIG. 1 is a block diagram illustrating an example networking environment for selective MAC address learning.

This document describes methods, systems, and apparatus for selective MAC address learning that is performed by a telecommunications device (e.g., an Optical Network Unit (ONU)). For example, a telecommunications device can use a Source-Address-Learning method to learn MAC addresses (e.g., store the MAC addresses in a forwarding table of the telecommunications device) only from unicast packets, rather than storing MAC addresses for all communications packets. For example, MAC addresses in broadcast and/or multicast packets are not learned and/or stored in the forwarding table of the telecommunications device. Although this disclosure refers to optical telecommunications systems for purposes of example, the subject matter of this document can be applied to other types of telecommunications systems or other systems that offer Ethernet LAN (E-LAN) service.

An Ethernet MAC-switched network can connect a large number of hosts (e.g., computers, Optical Network Terminals, business CPEs, xDSL modems, cable modems, residential gateways). When using a Source-Address-Learning method, each switching device in the Ethernet MAC-switched network can learn MAC addresses of the hosts via source MAC addresses in received packets, and may require a large Content Addressable Memory (CAM) forwarding table to learn (i.e., store) addresses of the large number of hosts. When a CAM forwarding table in a switching device (e.g., an inexpensive switching device) is limited in size, the addresses of the large number of hosts cannot all be learned, and most of the addresses may remain unknown to the switching device. In addition, due to various protocols (e.g., ARP, ICMPv6) that use broadcast and/or multicast packets which are flooded, the CAM forwarding table may be routinely over-written with MAC addresses learned from source MAC addresses of broadcast and/or multicast packets from hosts for which the switching device typically does not carry traffic (e.g., undesirable MAC addresses). Furthermore, Ethernet packets with unknown destination MAC addresses (e.g., destination MAC address not found in the CAM forwarding table) are flooded (e.g., transmitted over all ports). When there is a constant background broadcast and/or multicast traffic in the network, the switching device may be continuously over-writing its CAM forward table with MAC addresses that typically do not carry traffic for the switching device (e.g., undesirable MAC addresses), and thereby flooding most (if not nearly all) traffic. Flooding unicast packets (e.g., transmitted unicast packets over all ports) may reduce network capacity and affect allocated bandwidth in large-scale MAC-switched networks.

The disclosed subject matter addresses problems that arise when carrier Ethernet E-LAN service (i.e., MAC-switched service) is offered via a Passive Optical Network (PON) (e.g., a Gigabit Passive Optical Network (GPON)) and/or Optical Network Units (ONUs) (also referred to as Optical Network Terminals (ONTs)) at the network edge have limited CAM space. In the present disclosure, instead of learning all MAC addresses in received packets, a telecommunications device (e.g., a switching device, an ONU, an Optical Line Termination (OLT)) selectively learns MAC addresses in the received packets to utilize its limited CAM forwarding table more efficiently. In the selective learning model, the telecommunications device learns MAC Addresses by Source-Address-Learning and only learns source MAC addresses of unicast packets. For example, when receiving unicast packets, the telecommunications device learns source MAC addresses in the received unicast packets and store (or update) the learned source MAC addresses in its CAM forwarding table. However, when receiving broadcast and/or multicast packets, the telecommunications device will not learn source MAC addresses in the received broadcast and/or multicast packets. As a result, the CAM forwarding table will not be routinely over-written by broadcast and/or multicast traffic. In doing so, the limited CAM space may be used to store MAC addresses only when unicast traffic is seen from the source, thereby improving the likelihood that MAC addresses that carry traffic specifically addressed for delivery to the telecommunications device are stored in its CAM forwarding table. As a result, flooding a unicast packet due to unknown destination MAC address in the CAM forwarding table may be reduced. In addition, allocated bandwidth of an E-LAN can be preserved from flooded unicast packets.

FIG. 1 is a block diagram illustrating an example networking environment 100 for selective MAC address learning. As illustrated in FIG. 1, the environment 100 includes an access node 102, an E-LAN 106 that provides Ethernet service, and network 130. The access node 102 (e.g., TA5000) can serve as a first aggregation point to the network 130. In some implementations, the environment 100 may include additional and/or different components not shown in the block diagram, such as one or more access nodes, another type of network that provides network services, or a combination of these and other technologies. In some implementations, components may also be omitted from the environment 100. As illustrated in FIG. 1, the E-LAN 106 is depicted as a single E-LAN, but may be comprised of more than one E-LANs without departing from the scope of this disclosure.

As illustrated, the access node 102 includes a switch component 104 and an OLT 108. The switch component 104 connects the OLT 108 to the network 130. In some implementations, the switch component 104 forwards packets from the network 130 to the E-LAN 106 and forwards packets from the E-LAN 106 to the network 130. In addition to the data plane forwarding functionality, the switch component 104 is also responsible for forwarding management traffic between the access node 102 and a management system in the network.

As illustrated, the E-LAN 106 includes the OLT 108 at a service provider's central office (or other distribution point) and a number of ONUs 110, 112, and 114, which are located near end users. The OLT 108 is coupled to the number of ONUs 110, 112, and 114, thereby forming a point-to-multipoint Passive Optical Network (PON). For example, in the case of Gigabit Passive Optical Network (GPON), a single OLT can have 8 (or another number of) ports and each port can connect to 128 (or another number of) different ONUs.

The OLT 108 learns the MAC addresses of each ONU (e.g., ONU 110, ONU 112, ONU 114) and/or the residential gateways connected to those ONUs via source MAC addresses in received packets. Similarly, it also learns MAC addresses of the devices connected to the switch component upstream in the network via source MAC addresses in received packets. In some implementations, the OLT 108 may selectively learn MAC addresses based on received packet distribution types (discussed in more detail below). When packets are received from the switch component 104 and are not destined to the OLT 108, the OLT 108 may check the packets and its CAM forwarding table to determine how and where to forward the packets. For example, if receiving a broadcast packet 120, the OLT 108 may forward the broadcast packet 120 to all ONUs including ONU 110, ONU 112, and ONU 114. If receiving a unicast packet 122 to ONU 110 or one or more devices connected to the ONU, the OLT 108 may forward the unicast packet 122 to the ONU 110.

The ONUs (e.g., ONU 110, ONU 112, ONU 114) are generally located at network edge and have limited CAM spaces. In normal operations, only several MAC addresses are needed in a CAM table of an ONU since traffic of the ONU is normally between the OLT and one or more devices connected to the ONU. To prevent its limited CAM table from being over-written by undesirable MAC addresses, the ONU implements selective MAC address learning via source MAC addresses in received packets. For example, when receiving a unicast packet 122, ONU 110 may learn the source MAC address that is included in the received unicast packet 122, and store the learned source MAC address in its CAM table. When receiving a broadcast packet 120 (or a multicast packet not shown in FIG. 1), the ONU 110 will not perform source MAC address learning on the received broadcast packet 120. As a result, the CAM table of the ONU 110 will not be over-written by the source MAC address included in the received broadcast packet 120, which is generally undesirable to the ONU 110. ONU 112 and ONU 114 also receive the broadcast packet 120 sent over the E-LAN 106. In this example, neither the ONU 112 nor the ONU 114 will perform source MAC address learning on the received broadcast packet 120 because the broadcast packet 120 is not a unicast packet. As a result, CAM tables of the ONU 112 and the ONU 114 will not be over-written by the source MAC address included in the received broadcast packet 120.

The network 130 facilitates wireless or wireline communications between the components of the environment 100 with any other local or remote computer, such as additional E-LANs, servers, or other devices communicably coupled to the network 130, including those not illustrated in FIG. 1. As illustrated in FIG. 1, the network 130 is depicted as a single network, but may be comprised of more than one network without departing from the scope of this disclosure.

In some situations, one or more of the illustrated components may be implemented, for example, as one or more cloud-based services or operations. The network 130 may be all or a portion of a service provider's access or aggregation network, an enterprise or secured network, or at least a portion of the network 130 may represent a connection to the Internet, a public switched telephone network (PSTN), a data server, a video server, or additional or different networks. In some implementations, a portion of the network 130 may be a virtual private network (VPN). Further, all or a portion of the network 130 can comprise either a wireline or wireless link. Example wireless links may include 802.11ac/ad/af/a/b/g/n, 802.20, WiMax, LTE, and/or any other appropriate wireless link. In other words, the network 130 encompasses any internal or external network, networks, sub-network, or combination thereof, operable to facilitate communications between various computing components, inside and outside the environment 100. The network 130 may communicate, for example, Internet Protocol (IP) packets, Frame Relay frames, Asynchronous Transfer Mode (ATM) cells, voice, video, data, and other suitable information between network addresses. The network 130 may also include one or more local area networks (LANs), radio access networks (RANs), metropolitan area networks (MANs), wide area networks (WANs), all or a portion of the Internet, and/or any other communication system or systems at one or more locations.

Figure 2:
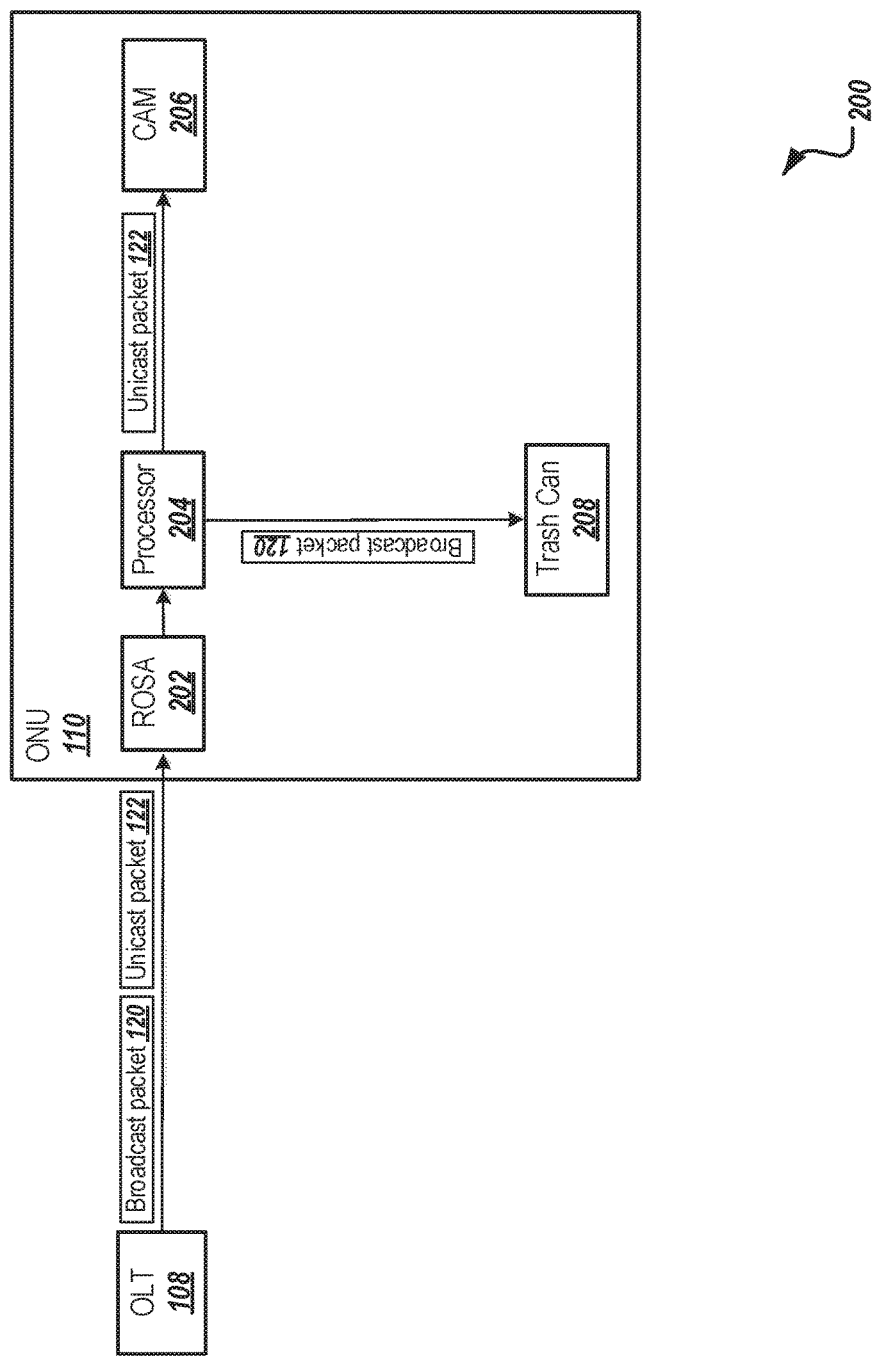
FIG. 2 is a block diagram illustrating an example networking environment for an example telecommunications device to selectively update its Content Addressable Memory (CAM) forwarding table.

FIG. 2 is a block diagram illustrating an example networking environment 200 for an example telecommunications device (i.e., ONU 110) to selectively update its Content Addressable Memory (CAM) forwarding table. The environment 200 shown in FIG. 2 illustrates a simple interaction between the OLT 108 and the ONU 110 when the OLT 108 forwards (or transmits) a broadcast packet 120 and a unicast packet 122 to the ONU 110. In some implementations, the environment 200 may include additional and/or different components not shown in the block diagram. Components may also be omitted from the environment 200. The components illustrated in FIG. 2 may be similar to or different from those described in FIG. 1.

As illustrated in FIG. 2, the environment 200 includes the OLT 108 and the ONU 110. The ONU 110 includes a receiver optical sub-assembly (ROSA) 202 for receiving downstream data from the OLT 108, a processor 204, a CAM table 206, and a trash can 208 (e.g., a place to hold received broadcast and multicast packets). In operation, the ROSA 202 receives an optical signal as input, and outputs an electric signal.

As illustrated in FIG. 2, the ONU 110 includes a processor 204. Although illustrated as a single processor 204 in FIG. 2, two or more processors may be used according to particular needs, desires, or particular implementations of the ONU 110. Each processor 204 may be a central processing unit (CPU), an application-specific integrated circuit (ASIC), a field-programmable gate array (FPGA), or another suitable component. Generally, the processor 204 executes instructions and manipulates data to perform the operations of the ONU 110. Specifically, the processor 204 executes the selective source MAC address learning described in the illustrated figures, including the operations performing the functionality associated with the ONU 110. For example, the processor 204 can determine whether a received packet is a unicast packet, broadcast packet, or a multicast packet based on, for example, an identified destination IP address in the received packet. In addition, the processor 204 can determine the source MAC address included in the received packet (e.g., identify the source MAC address at some specific location of the received packet).

For purposes of example, assume that a broadcast packet 120 is received from the OLT 108, and that the processor 204 determines that the received packet is a broadcast packet (e.g., a packet having a one-to-many distribution type) based on, for example, a broadcast MAC/IP address identified in the broadcast packet 120. In this example, the processor 204 will not perform source MAC address learning for the broadcast packet 120 because the packet is a broadcast packet. After processing the broadcast packet 120 (e.g., obtaining data in the payload area), the broadcast packet 120 is dropped, for example, in the trash can 208.

In another example, assume that a unicast packet 122 is received from the OLT 108, and that the processor 204 determines that the received packet is a unicast packet (e.g., a packet having a one-to-one distribution type) based on, for example, a unicast MAC or IP address identified in the unicast packet 122. In this example, the processor 204 will perform source MAC address learning for the unicast packet 122 because the packet is a unicast packet rather than a broadcast or multicast packet. For example, the processor 204 identifies the source MAC address in the unicast packet 122, and stores the source MAC address in the CAM table 206 if the source MAC address has not been previously (e.g., is not currently) stored in the CAM table 206. In some implementations, if the source MAC address is already in the CAM table 206, no action is required to update the table.

Figure 3:
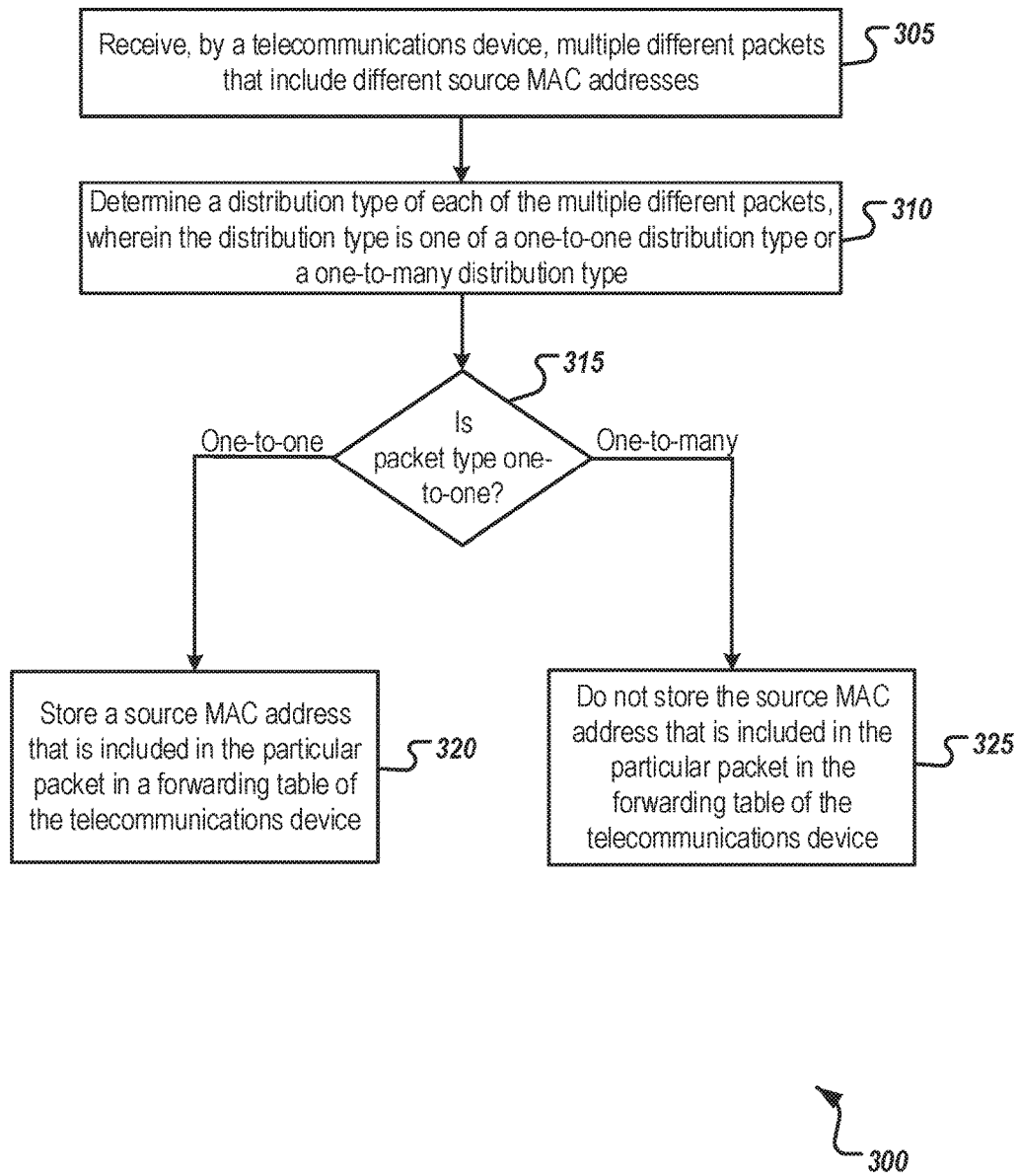
FIG. 3 is a flow chart of an example process for selectively learning MAC addresses based on received packet distribution types.

FIG. 3 is a flow chart of an example process 300 for selectively learning MAC addresses based on received packet distribution types. The example process 300 can be performed, for example, by one or more telecommunications devices, such as those described with reference to FIGS. 1 and 2 (e.g., OLT 108, ONU 110). The example process 300 can also be implemented as instructions stored on a non-transitory, computer-readable medium that, when executed by one or more telecommunications devices, configures the one or more telecommunications devices to perform and/or cause the one or more telecommunications devices to perform the actions of the example process 300.

Multiple different packets are received by a telecommunications device (305). The multiple different packets include different source MAC addresses. In some implementations, the multiple different packets are transmitted over a same Virtual LAN (V-LAN) and received by the telecommunications device over the V-LAN. In some implementations, the packets are Ethernet packets. The telecommunications device can be an Optical Network Unit (ONU) or an Optical Line Termination (OLT) in a Gigabit Passive Optical Network (GPON) offering carrier Ethernet LAN (E-LAN) service. This implementation equally applies to more advanced recent 10G PONs as well and not limited to GPON. E-LAN is a special form of V-LAN (i.e., a point to multipoint V-LAN) and the E-LAN service is MAC-switched.

For each of the multiple different packets, a distribution type is determined (310). The distribution type is one of a one-to-one distribution type or a one-to-many distribution type. For example, a unicast packet has a distribution type of one-to-one. A broadcast packet or a multicast packet has a distribution type of one-to-many. In some implementations, a unicast packet with an unknown destination MAC address may be flooded. In some implementations, the flooded unicast packet still has a distribution type of one-to-one.

A determination is made whether the distribution type of the particular packet is one-to-one or one-to-many (315). If the particular packet has the one-to-one distribution type (e.g., a unicast packet), a forwarding table of the telecommunications device is updated (320). For example, a source MAC address that is included in the particular packet is stored in the forwarding table, for example, if not previously stored (e.g., if not currently found in the forwarding table).

A unicast packet with an unknown destination MAC address will be flooded on an E-LAN since the destination MAC address is unknown. In such situation, if the telecommunications device is the destination of the unicast packet, the telecommunications device will update its forwarding table with the source MAC address that is included in the unicast packet. If the telecommunications device is not the destination of the unicast packet, the telecommunications device will not update its forwarding table with the source MAC address that is included in the unicast packet. In some implementations, the forwarding table of the telecommunications device is a Content Addressable Memory (CAM) forwarding table.

If the particular packet has the one-to-many distribution type (e.g., a broadcast packet or a multicast packet), the forwarding table of the telecommunications device is not updated (325). For example, the source MAC address that is included in a broadcast packet or a multicast packet will not be stored in the forwarding table of the telecommunications device even when the source MAC address has not been previously stored in the forwarding table (e.g., is not currently found in the forwarding table). In some implementations, the telecommunications device only learns source MAC addresses of unicast packets (e.g., only updates its forwarding table with the source MAC addresses that are included in the unicast packets).

The example process 300 shown in FIG. 3 can be modified or reconfigured to include additional, fewer, or different actions (not shown in FIG. 3), which can be performed in the order shown or in a different order. For example, before 310, the telecommunications device identifies unicast packets that have known destination MAC addresses. In addition, the telecommunications device determines that the unicast packets are of the one-to-one distribution type. In some implementations, one or more of the actions shown in FIG. 3 can be repeated or iterated, for example, until a terminating condition is reached. In some implementations, one or more of the individual actions shown in FIG. 3 can be executed as multiple separate actions, or one or more subsets of the actions shown in FIG. 3 can be combined and executed as a single action. In some implementations, one or more of the individual actions shown in FIG. 3 may also be omitted from the example process 300.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method comprising:
    receiving, by a telecommunications device, multiple different packets that include different source MAC addresses;
    determining a distribution type of each of the multiple different packets, wherein the distribution type is one of a one-to-one distribution type or a one-to-many distribution type, and determined based on a destination address that is specified in each of the multiple different packets; and
    selectively updating a forwarding table of the telecommunications device based on the determined distribution type of each particular packet, including:
        not storing a source MAC address that specifies a source of the particular packet when the particular packet has the one-to-many distribution type; and
        storing the source MAC address that specifies the source of the particular packet when the particular packet has (i) the one-to-one distribution type and (ii) the destination address specifying that the telecommunications device is a destination of the particular packet.

2. The method of claim 1, wherein receiving the multiple different packets comprises receiving the multiple different packets that are transmitted over a same V-LAN.

3. The method of claim 1, wherein the telecommunications device is an Optical Network Unit (ONU).

4. The method of claim 1, wherein the telecommunications device is an Optical Line Termination (OLT).

5. The method of claim 1, wherein determining the distribution type of each of the multiple different packets includes:
    identifying unicast packets that have known destination MAC addresses; and
    determining that the unicast packets are of the one-to-one distribution type.

6. The method of claim 1, wherein packets of the one-to-many distribution type include broadcast packets and multicast packets.

7. The method of claim 1, wherein the forwarding table of the telecommunications device is a Content Addressable Memory (CAM) forwarding table.

8. A telecommunications device, comprising:
a communications interface that communicatively couples the telecommunications device with a plurality of network devices;
a memory structure storing machine executable instructions; and
one or more processors that execute the machine executable instructions and perform operations including:
receiving multiple different packets that include different source MAC addresses;
determining a distribution type of each of the multiple different packets, wherein the distribution type is one of a one-to-one distribution type or a one-to-many distribution type, and determined based on a destination address that is specified in each of the multiple different packets; and
selectively updating a forwarding table of the telecommunications device based on the determined distribution type of each particular packet, including:
not storing a source MAC address that specifies a source of the particular packet when the particular packet has the one-to-many distribution type; and
storing the source MAC address that specifies the source of the particular packet when the particular packet has (i) the one-to-one distribution type and (ii) the destination address specifying that the telecommunications device is a destination of the particular packet.

9. The device of claim 8, wherein receiving the multiple different packets comprises receiving the multiple different packets that are transmitted over a same V-LAN.

10. The device of claim 8, wherein the telecommunications device is an Optical Network Unit (ONU).

11. The device of claim 8, wherein the telecommunications device is an Optical Line Termination (OLT).

12. The device of claim 8, wherein determining the distribution type of each of the multiple different packets includes:
identifying unicast packets that have known destination MAC addresses; and
determining that the unicast packets are of the one-to-one distribution type.

13. The device of claim 8, wherein packets of the one-to-many distribution type include broadcast packets and multicast packets.

14. The device of claim 8, wherein the forwarding table of the telecommunications device is a Content Addressable Memory (CAM) forwarding table.

15. A system, comprising:
a plurality of network devices, each network device configured to send packets to a telecommunications device; and
the telecommunications device configured to:
receive multiple different packets that include different source MAC addresses;
determine a distribution type of each of the multiple different packets, wherein the distribution type is one of a one-to-one distribution type or a one-to-many distribution type, and determined based on a destination address that is specified in each of the multiple different packets; and
selectively update a forwarding table of the telecommunications device based on the determined distribution type of each particular packet, including:
not storing a source MAC address that specifies a source of the particular packet when the particular packet has the one-to-many distribution type; and
storing the source MAC address that specifies the source of the particular packet when the particular packet has (i) the one-to-one distribution type and (ii) the destination address specifying that the telecommunications device is a destination of the particular packet.

16. The system of claim 15, wherein receiving the multiple different packets comprises receiving the multiple different packets that are transmitted over a same V-LAN.

17. The system of claim 15, wherein the telecommunications device is an Optical Network Unit (ONU).

18. The system of claim 15, wherein the telecommunications device is an Optical Line Termination (OLT).

19. The system of claim 15, wherein determining the distribution type of each of the multiple different packets includes:
identifying unicast packets that have known destination MAC addresses; and
determining that the unicast packets are of the one-to-one distribution type.

20. The system of claim 15, wherein packets of the one-to-many distribution type include broadcast packets and multicast packets.

* * * * *